United States Patent
Smith et al.

(10) Patent No.: US 6,567,043 B2
(45) Date of Patent: May 20, 2003

(54) METHOD AND APPARATUS FOR IMPROVING UTILITY OF AUTOMATIC DEPENDENT SURVEILLANCE

(75) Inventors: Alexander E. Smith, McLean, VA (US); Carl Evers, Rockville, MD (US)

(73) Assignee: Rannoch Corporation, Alexandria, VA (US)

(*) Notice: Subject to any disclaimer, the term of this patent is extended or adjusted under 35 U.S.C. 154(b) by 0 days.

(21) Appl. No.: 09/971,672

(22) Filed: Oct. 9, 2001

(65) Prior Publication Data

US 2002/0021247 A1 Feb. 21, 2002

Related U.S. Application Data (62) Division of application No. 09/516,215, filed on Feb. 29, 2000.
(60) Provisional application No. 60/123,170, filed on Mar. 5, 1999.

(51) Int. Cl.[7] .................................................. G01S 3/02
(52) U.S. Cl. ........................................ 342/450; 342/456
(58) Field of Search .......................... 342/32, 450, 453, 342/455, 456, 457; 701/120, 121

(56) References Cited

U.S. PATENT DOCUMENTS

| | | |
|---|---|---|
| 3,705,404 A | 12/1972 | Chisolm |
| 4,196,474 A | 4/1980 | Buchanan et al. |
| 4,229,737 A | 10/1980 | Heldwein et al. |
| 4,454,510 A | 6/1984 | Crow |
| 4,524,931 A | 6/1985 | Nilsson |
| 4,688,046 A | 8/1987 | Schwab |
| 4,782,450 A | 11/1988 | Flax |
| 5,144,315 A | 9/1992 | Schwab |
| 5,191,342 A | 3/1993 | Alsup et al. |
| 5,262,784 A | 11/1993 | Drobnicki et al. |
| 5,365,516 A | 11/1994 | Jandrell |
| 5,374,932 A | 12/1994 | Wyschogrod et al. |
| 5,402,116 A | 3/1995 | Ashley |
| 5,528,244 A | 6/1996 | Schwab |
| 5,570,095 A | 10/1996 | Drouilhet, Jr. et al. |
| 5,596,326 A | 1/1997 | Fitts |
| 5,596,332 A | 1/1997 | Coles et al. |
| 5,627,546 A | 5/1997 | Crow |
| 5,680,140 A | 10/1997 | Loomis |
| 5,714,948 A | 2/1998 | Farmakis et al. |
| 5,774,829 A | 6/1998 | Cisneros et al. |

(List continued on next page.)

FOREIGN PATENT DOCUMENTS

| | | |
|---|---|---|
| JP | 6-342061 A | 12/1994 |
| JP | 8-146130 A | 5/1996 |
| JP | 9-119983 A | 11/1996 |
| JP | 9-288175 A | 11/1997 |

OTHER PUBLICATIONS

Traffic Alert System Technical Design Summary, Final Report, Apr. 1994 (Baldwin et al.).

(List continued on next page.)

*Primary Examiner*—Dao Phan
(74) *Attorney, Agent, or Firm*—Robert Platt Bell (57) ABSTRACT

The surveillance system provides a means to augment Automatic Dependent Surveillance—Broadcast (ADS-B) with "look alike ADS-B" or "pseudo ADS-B" surveillance transmissions for aircraft which may not be ADS-B equipped. The system uses ground based surveillance to determine the position of aircraft not equipped with ADS-B, then broadcasts the identification/positional information over the ADS-B data link. ADS-B equipped aircraft broadcast their own position over the ADS-B data link. The system enables aircraft equipped with ADS-B and Cockpit Display of Traffic Information (CDTI) to obtain surveillance information on all aircraft whether or not the proximate aircraft are equipped with ADS-B.

24 Claims, 4 Drawing Sheets

U.S. PATENT DOCUMENTS

| | | | |
|---|---|---|---|
| 5,781,150 | A | 7/1998 | Norris |
| 5,867,804 | A | 2/1999 | Pilley et al. |
| 5,999,116 | A | 12/1999 | Evers |
| 6,049,304 | A | 1/2000 | Rudel et al. |
| 6,085,150 | A | 7/2000 | Henry et al. |
| 6,094,169 | A | 7/2000 | Smith et al. |
| 6,211,811 | B1 | 4/2001 | Evers |

OTHER PUBLICATIONS

Airscene, The complete Air Traffic Picture in Real Time, www.airscene.com, Rannoch Corporation, Alexandria, Virginia, undated.

GPS Relative Accuracy for Collision Avoidance, Institute of Navigation Technical Meeting, Jan. 1997 (Rudel et al.).

Provisional U.S. Patent Application Ser. No. 60/123,170 filed Mar. 5, 1999.

Protest Letter dated May 16, 2002 from Otto M. Wildensteiner, U.S. Department of Transportation, Washington, DC.

"Comparison of Claims in Application Ser. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS–B)", RTCA, Inc. Washington, DC, ©1998.

"Runway Incursion Reduction Program Dallas–Ft. Worth Formal Evaluation Report, Final Report", Trios Associates, Inc. Dec. 21, 2000.

"TIS–B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC–186, Aug. 17, 1995, RTCA Paper No. 449–95/SC186–033.

"The Universal Access Tranceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND–410) Sep. 4, 1998.

"Phase I –Operational Evaluation FINAL REPORT Cargo Airline Association ADS–B Program, FAA SafeFlight 21 Program" Apr. 10, 2000.

"TIS–B Concept and Approach", MITRE, Chris Moody, Feb. 29, 2000.

"Capstone Program Plan Version 1.0", Federal Aviation Administration, Mar. 10, 1999.

"RTCA Special Committee 186, Working Group 5 ADS–B UAT MOPS Meeting #2, Proposed Contents and Transmission Rates for ADS–B Messages" Chris Moody, MITRE Corp., Feb. 20, 2001.

"Airborne Information Initiatives: Capitalizing on a Multi–Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC–186 WG–2 (TIS–B) Meeting ", 13–14 Jun. 2000.

METHOD AND APPARATUS FOR IMPROVING UTILITY OF AUTOMATIC DEPENDENT SURVEILLANCE

CROSS-REFERENCE TO RELATED APPLICATIONS

The present application is a Divisional Application of U.S. patent application Ser. No. 09/516,215, filed on Feb. 29, 2000, entitled "METHOD AND APPARATUS FOR IMPROVING THE UTILITY OF AUTOMATIC DEPENDENT SURVEILLANCE", incorporated herein by reference.

This application claims priority from Provisional U.S. patent application Ser. No. 60/123,170, filed Mar. 5, 1999, and incorporated herein by reference in its entirety.

The subject matter of the present application is related to that in the following copending U.S. Patent Applications:

| Ser. No. | Filing Date | Inventor |
|---|---|---|
| 08/891,227 | July 10, 1997 | Rudel et al. |
| 09/114,921 | July 14, 1998 | Evers et al. |
| 09/209,008 | December 11, 1998 | Smith et al. |
| 60/113,169 | December 21, 1998 | Smith et al. |

All of which are incorporated herein by reference.

FIELD OF THE INVENTION

The present invention relates to the field of aircraft surveillance and monitoring, particularly toward a technique known as Automatic Dependent Surveillance.

BACKGROUND OF THE INVENTION

The Automatic Dependent Surveillance—Broadcast (ADS-B) concept has been introduced as a means to enhance future ground and avionics based surveillance of aircraft. This concept is defined in Minimum Aviation System Performance Standards for Automatic Dependent Surveillance Broadcast (ADS-B), RTCA/DO-186, February 1998, which is later referred to as ADS-B MASPS and is incorporated herein by reference. The ADS-B concept provides for aircraft and ground vehicles to periodically broadcast their state vector (horizontal and vertical position, horizontal and vertical velocity) and other information.

A specific implementation of a 1090 MHz based ADS-B system is described in Drouilhet et al., U.S. Pat. No. 5,570,095, issued Oct. 29, 1996 and incorporated herein by reference. The broadcast ADS-B message provides surveillance information to other users, principally Air Traffic Control (ATC) and aircraft/vehicle operators.

Applications for ADS-B include ATC display of traffic, runway incursion detection and alerting, and Cockpit Display of Traffic Information (CDTI). One example of CDTI is a map-like display centered on a pilot's aircraft showing relative positions and intentions of other proximate aircraft. Another example of CDTI is provided in Buchanan et al., U.S. Pat. No. 4,196,474, issued Apr. 1, 1980, also incorporated herein by reference.

The Federal Aviation Administration (FAA) and the National Aeronautics and Space Administration (NASA) have investigated the suitability of this technology to support these applications in the airport surface environment. NASA recently tested ADS-B using 1090 MHz data transmission in an airport surface environment as part of the Low Visibility Landing and Surface Operations (LVLASO) program. Tests have been performed to assess how well 1090 MHz ADS-B performs with respect to surveillance system requirements established by the International Civil Aviation Organization (ICAO) and RTCA.

Two issues were identified during ADS-B system implementation and testing at Atlanta Hartsfield International Airport (ATL) as described in "Application of ADS-B for Airport Surface Surveillance", Dan Hicok, Derrick Lee, 17$^{th}$ Digital Avionics System Conference, November, 1998:

1. A method may be required for CDTI equipped aircraft to obtain surveillance information on aircraft and ground vehicles which are not equipped with ADS-B.
2. Loss of ADS-B surveillance may occur due to multipath, blockage, and antenna pattern nulls.

Aircraft equipped with ADS-B and CDTI receive surveillance information directly from ADS-B transmissions. ADS-B implementation may require installation of new avionics equipment. There may inevitably be a transition period when some aircraft are ADS-B equipped and other aircraft are not. ADS-B MASPS has defined a means to augment ADS-B with a Traffic Information Services (TIS) data link, whereby ground based surveillance information for all aircraft is transmitted to CDTI capable aircraft.

An example of a TIS implementation may be found in Crow, U.S. Pat. No. 5,627,546, issued May 6, 1997, and incorporated herein by reference. Two sources of TIS traffic information are secondary surveillance radar and multilateration, as described in Schwab, U.S. Pat. No. 5,528,244, issued Jun. 18, 1996, and Alsup et al., U.S. Pat. No. 5,191,342, issued Mar. 3, 1993, both of which are incorporated herein by reference. A TIS data link was implemented at ATL for testing. A major limitation of TIS is the implementation may require aircraft owners to purchase a second data link in addition to the ADS-B link.

ATL testing also showed obstructions and multipath from structures may result in degradation or total loss of direct aircraft-to-aircraft ADS-B surveillance. The airport surface environment may be particularly challenging due to the presence of large structures, such as concourses and hangars. Loss of surveillance and degraded surveillance negatively impacts the ability of a pilot to maintain situational awareness of arrivals, departures and runway occupancy.

Accordingly, what is needed is a new method to augment the ADS-B concept using the ADS-B data link to provide surveillance information for aircraft and ground vehicles which are not equipped with ADS-B. This new method needs to provide a means to reinforce ADS-B transmissions which are adversely impacted by the environment.

SUMMARY OF THE INVENTION

The present invention provides an improved apparatus and method for use with Automatic Dependent Surveillance—Broadcast (ADS-B). In a method and apparatus of the present invention, each ADS-B equipped aircraft may periodically broadcast its position as derived from its navigation system.

Aircraft with ADS-B receivers may then be able to receive these broadcasts to obtain the location of proximate ADS-B equipped aircraft. The invention provides a means to augment ADS-B transmissions with position and identification information of aircraft which may not be ADS-B equipped.

In addition, the present invention reinforces ADS-B transmissions in areas where line-of-sight or multipath issues prevent reliable ADS-B communications between two aircraft.

DETAILED DESCRIPTION OF THE INVENTION

The present invention is now described with reference to the accompanying Figures where like reference numbers denote like element or steps.

Figure 1:
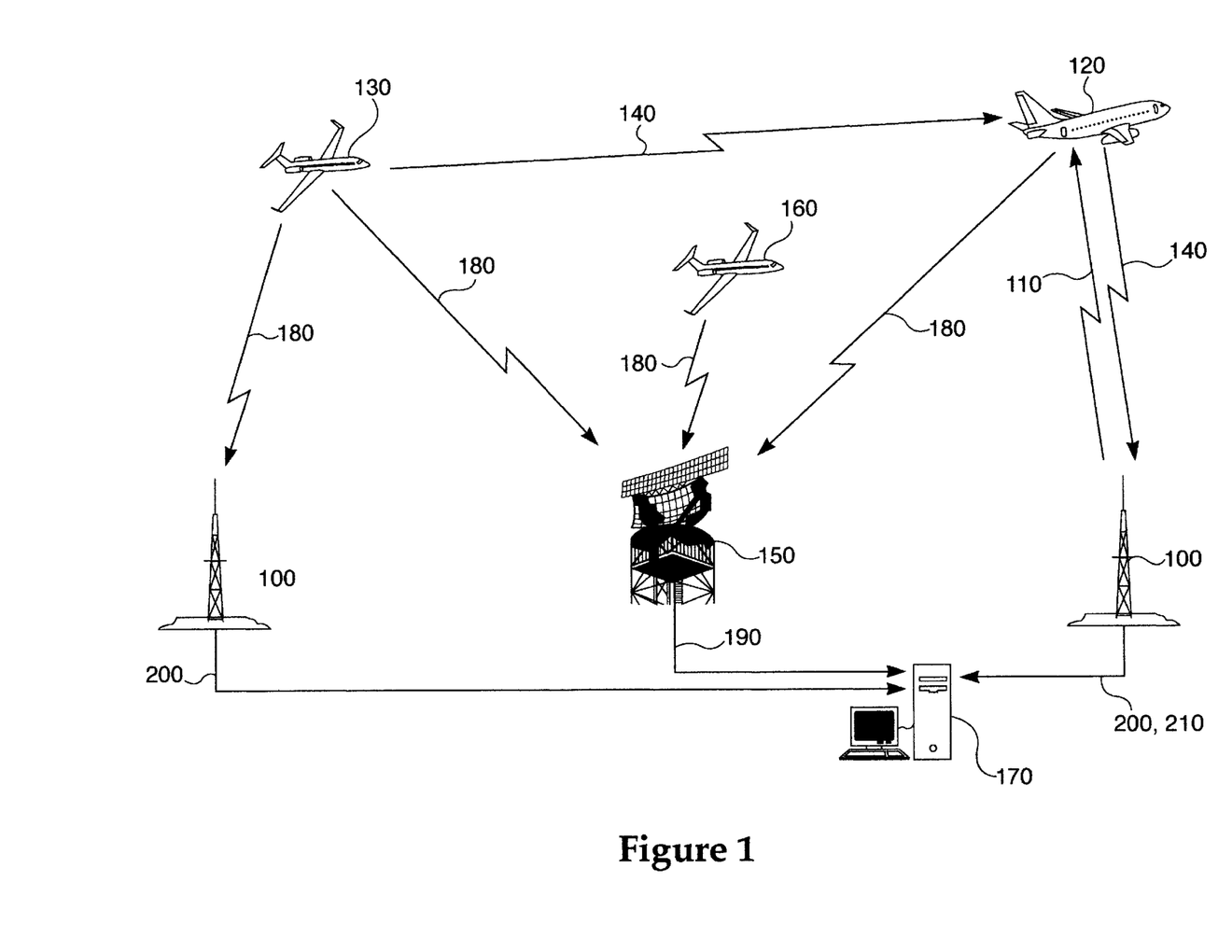
FIG. 1 is a diagram depicting "pseudo" ADS-B augmentation ADS-B concept using SSR Surveillance.

In the preferred embodiment, a "pseudo" ADS-B ground system comprising one or more 1090 MHz remote receiver/transmitters 100 and a central workstation 170 may be used to provide a source for 1090 MHz "pseudo" ADS-B transmissions 110, as illustrated in FIG. 1. 1090 MHz "pseudo" ADS-B transmissions 110 serve to augment 1090 MHz ADS-B transmission 140 thus providing ADS-B/CDTI equipped aircraft 120 with a complete picture of all proximate aircraft 130, 160.

As defined by the ADS-B concept [RTCA ADS-B MASPS], aircraft equipped with ADS-B 130, 120 periodically broadcast their own position information via ADS-B transmission. In the preferred embodiment these ADS-B transmissions may be performed using an aircraft transponder frequency of 1090 MHz. ADS-B/CDTI equipped aircraft 120 receive and decode these 1090 MHz ADS-B transmissions 140 to obtain position information on proximate ADS-B equipped aircraft 130.

The 1090 MHz "pseudo" ADS-B ground system provides ADS-B/CDTI equipped aircraft 120 with periodic 1090 MHz ADS-B like broadcast transmissions or 1090 MHz "pseudo" ADS-B transmissions 110 representing position data for aircraft not equipped with ADS-B 160. While FIG. 1 illustrates only one 1090 MHz remote receiver/transmitter 100 performing 1090 MHz "pseudo" ADS-B transmissions 110, any or all 1090 MHz remote receiver/transmitters 100 may broadcast 1090 MHz "pseudo" ADS-B transmissions 110.

1090 MHz remote receiver/transmitters: 100 receives and decodes 1090 MHz ADS transmissions 140 to identify and locate ADS-B equipped aircraft 120, 130. 1090 MHz remote receiver/transmitters 100 send ADS-B surveillance data 200 to central workstation 170. Central workstation 170 receives target information 190 from Secondary Surveillance Radar (SSR) 150 and/or a 1090 MHz multilateration system to obtain surveillance information for all transponder equipped aircraft 120, 130, including non-ADS-B aircraft 160.

All aircraft which are ADS-B equipped may have a transponder. Non ADS-B aircraft may also be provided with a transponder. The transponder generates a radio signal identifying the aircraft (and optionally providing altitude or other data) either periodically, in response to a radar signal, or when "squawked" by the pilot or other operator of the aircraft.

Central workstation 170 correlates 1090 MHz ADS-B aircraft targets to transponder equipped targets. Central workstation 170 identifies transponder equipped targets which do not have a corresponding ADS-B position, thus may not be ADS-B equipped (e.g., aircraft 160 in FIG. 1). Transponder identification and position information for non-ADS-B equipped aircraft 210 may be sent to 1090 MHz remote receiver/transmitters 100 where it may be broadcasted via 1090 MHz "pseudo" ADS-B transmissions 110.

Figure 3:
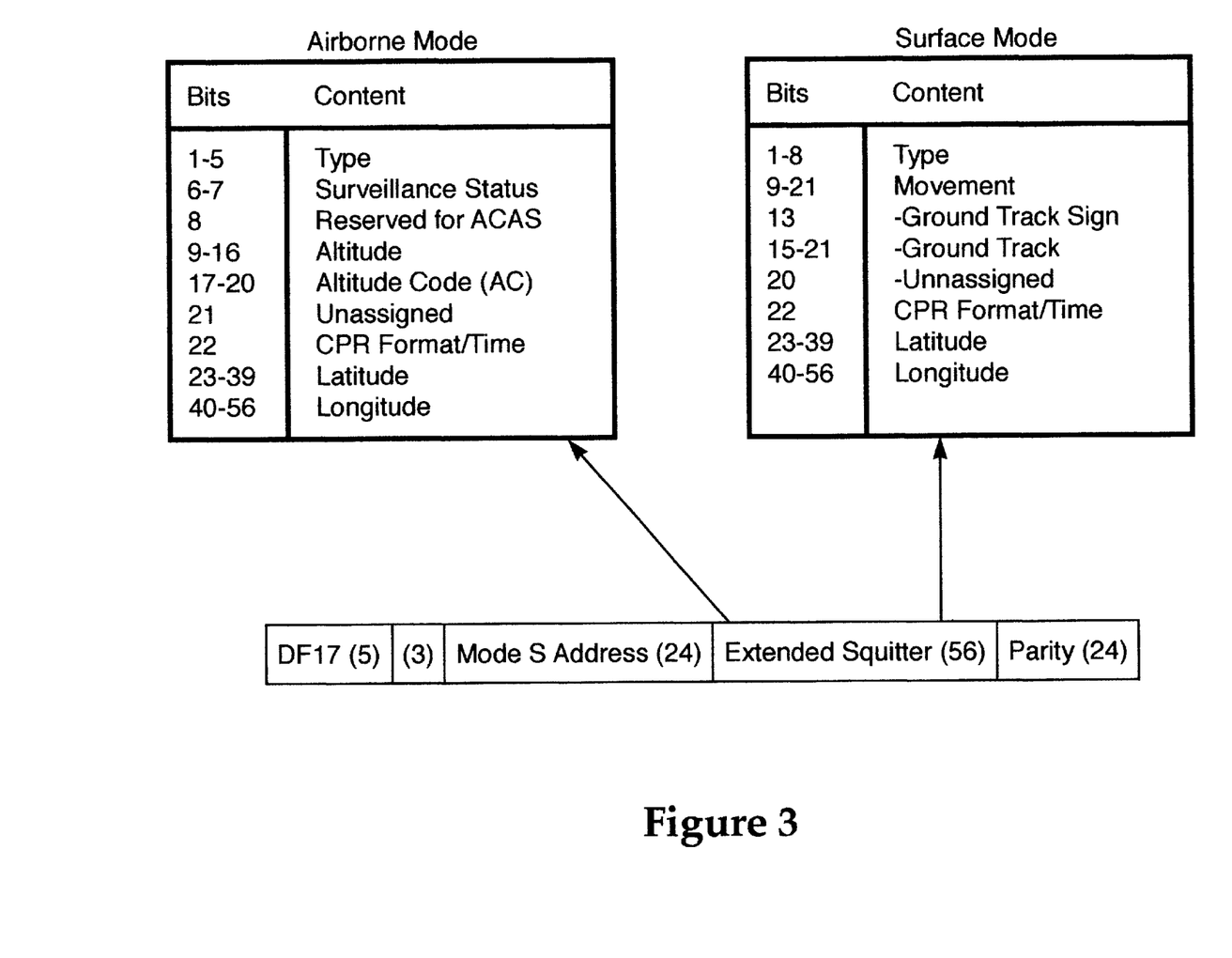
FIG. 3 is a diagram depicting a 1090 MHz ADS-B format.

One version of 1090 MHz ADS-B position report 140 format may be defined in FIG. 3. Aircraft may be equipped with either a Mode S or an ATCRBS transponder as defined in Minimum Operational Performance Standards for Air Traffic Control Radar Beacon System/Mode Select (ATCRBS/MODE S) Airborne Equipment, RTCA/DO-181A, January 1992. The ADS-B message address may be identical to the Mode S transponder address. Accordingly, the ADS-B address may be obtained directly from the Mode S address.

Some aircraft may be equipped with ATCRBS transponders, instead of Mode S. The ATCRBS message contains a Mode A address, which may be used to generate a ADS-B address. One method to convert Mode A address to ADS-B message address may be to apply an algorithm which converts an aircraft tail number (e.g., registration number or N-number) to a 24 bit address. Mode A address may be converted from the tail number obtained by accessing flight plan information. In turn, the tail number may be converted to a ADS-B address. This algorithm is presently used by the Federal Aviation Administration to assign newly installed Mode S transponders with an address.

1090 MHz remote receiver/transmitters 100 may generate "pseudo" ADS-B transmissions 110 for ground vehicles operating on an airport movement area. Ground vehicle surface surveillance may be obtained from a primary radar or other surveillance means. The "pseudo" ADS-B transmissions mimic the format and style of "real" ADS-B transmissions, and thus are indistinguishable to ADS-B equipment provided in an aircraft. The "pseudo" ADS-B transmission is created from secondary aircraft location data (e.g., radar, multilateration, or the like) for non-ADS-B equipped aircraft. An airplane receiving "pseudo" ADS-B data processes such data in the same manner as "real" ADS-B data, and thus can locate, using ADS-B equipment, non-ADS-B equipped aircraft (e.g., aircraft 160).

As may be readily appreciated by one of ordinary skill in the art, the use of such "pseudo" ADS-B transmissions allows the ADS-B system to be used even in situations where not all aircraft are ADS-B equipped. Of course, non-ADS-B aircraft will still not be detected in areas where "pseudo" ADS-B transmission equipment is not located. However, the risk of collision and situations of heavy traffic usually occur in major metropolitan and airport areas which can be readily served by such a "pseudo" ADS-B system.

Figure 2:
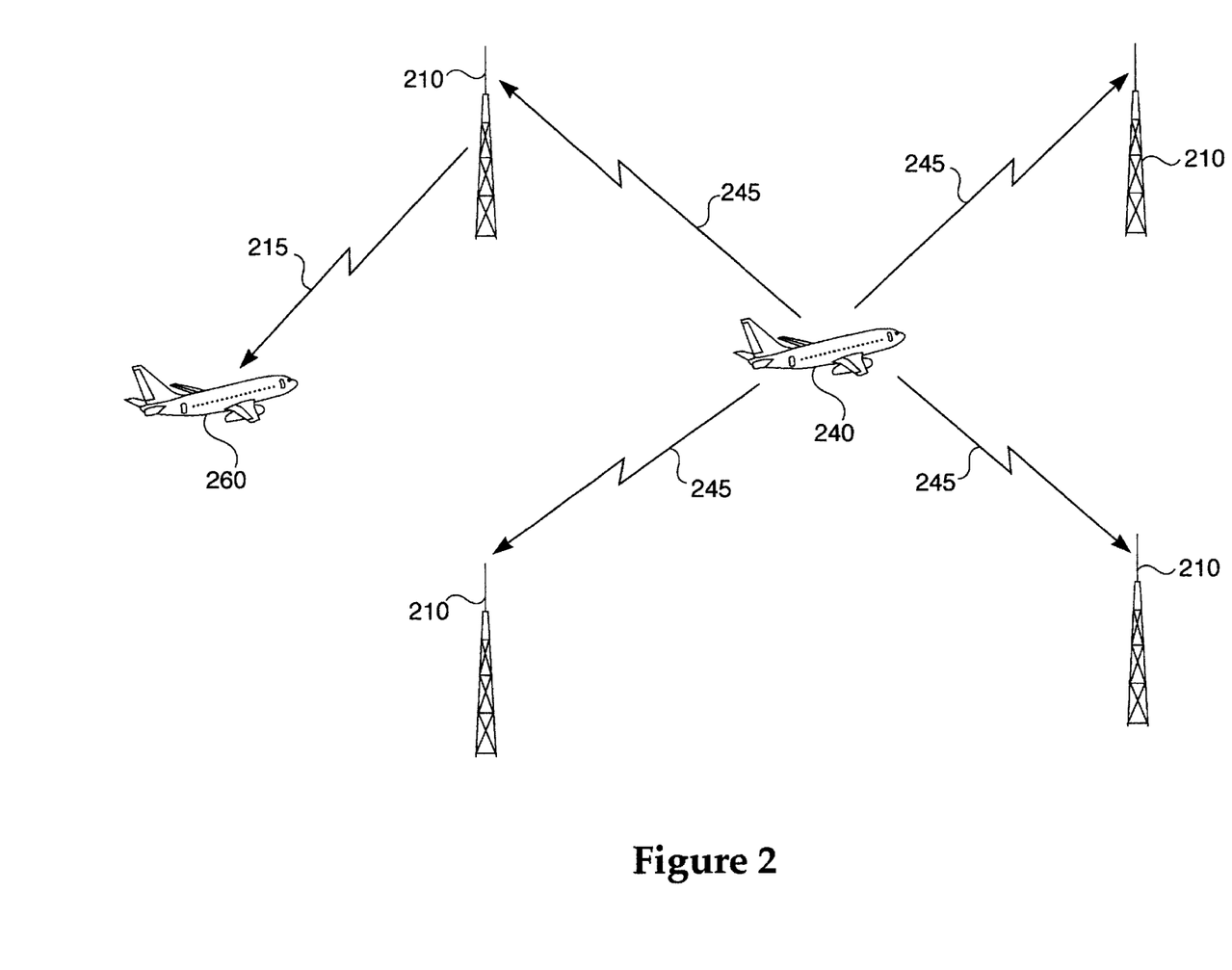
FIG. 2 is a diagram depicting "pseudo" ADS-B augmentation ADS-B concept using Multilateration Surveillance.

An ADS-B augmentation using 1090 MHz multilateration as a surveillance source is illustrated in FIG. 2. Multilateration systems receive aircraft transponder transmissions 245 and apply Time Difference of Arrival techniques to determine an aircraft position. A basic requirement of a multilateration system may be to provide a Time of Arrival (TOA) measurement capability. An example of such a multilateration system is discussed in co-pending U.S. patent application Ser. No. 09/209,008, entitled "Passive Multilateration Auto-Calibration and Position Error Correction", incorporated herein by reference.

A plurality of 1090 MHz remote receiver/transmitters 210 with TOA measurement hardware provide a means to perform multilateration to determine a position of aircraft not equipped with ADS-B 240. 1090 MHz remote receiver/transmitters 210 provide traffic information to ADS-B/CDTI equipped aircraft 260 via "pseudo" ADS-B transmissions 250.

Figure 4:
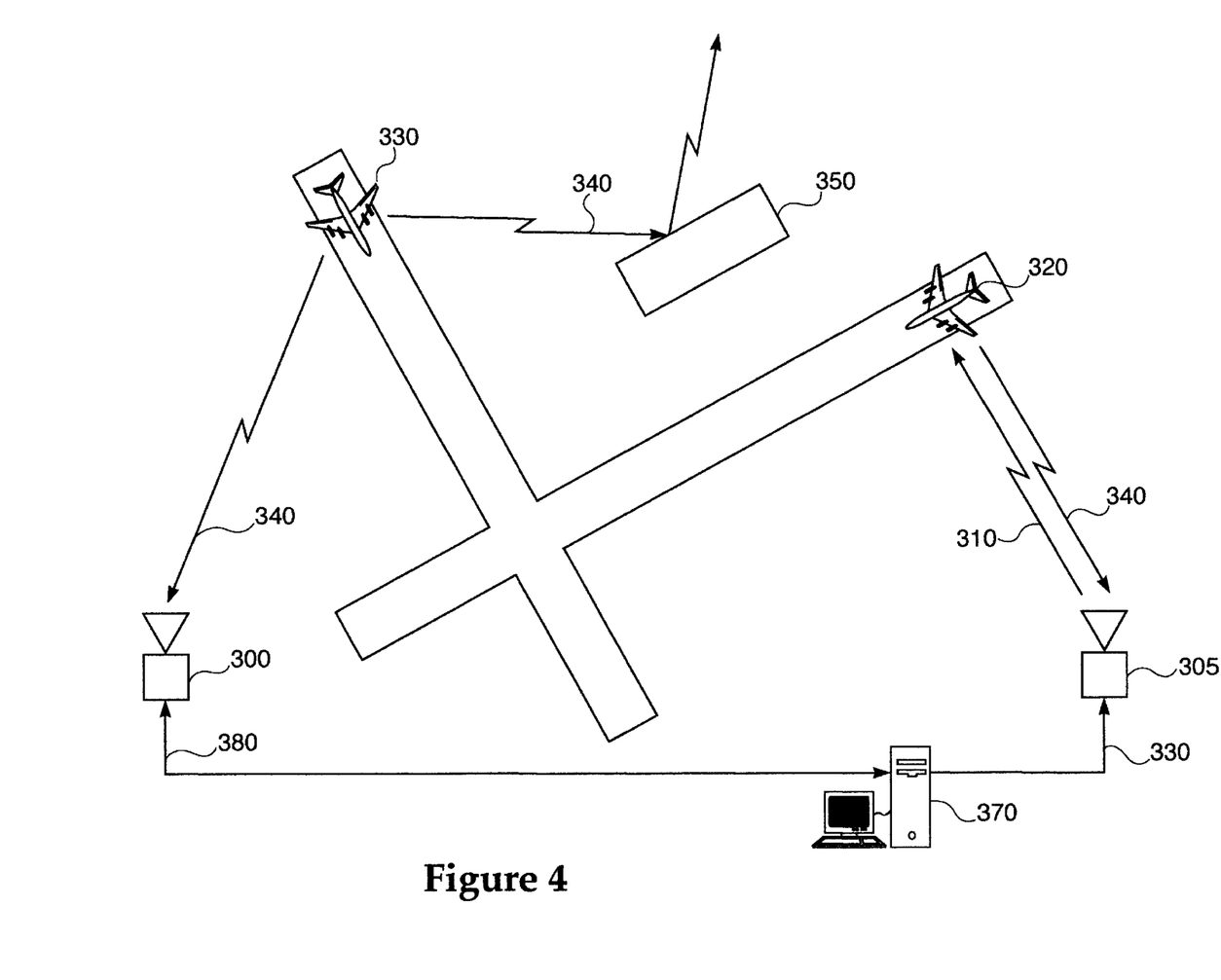
FIG. 4 is a diagram depicting "pseudo" ADS-B reinforcement of ADS-B transmissions.

The "pseudo" ADS-B ground system provides a means to reinforce 1090 MHz ADS-B transmissions 340 with 1090

MHz "pseudo" ADS-B transmissions 310, as illustrated in FIG. 4. A system comprising a central workstation 370 and a plurality of 1090 MHz receiver/transmitters 300 and 305 provides diversity for both receiving ADS-B messages 340 and transmitting "pseudo" ADS-B messages 310. FIG. 4 illustrates a case where line-of-sight may be obstructed by a building 350 between two ADS-B/CDTI equipped aircraft 330 and 320 operating on intersecting runways.

One aircraft may be designated as the source aircraft 330 and the other aircraft may be designated as the destination aircraft 320. When source aircraft 330 transmits a 1090 MHz ADS-B transmission 340, it may be received by a 1090 MHz remote receiver/transmitter 300. Decoded ADS-B transmission 380 may be sent to a central workstation 370. Central workstation 370 determines when another 1090 MHz ADS-B/CDTI equipped aircraft 320 may require traffic information reinforcement with decoded ADS-B transmission 380.

Central workstation 370 routes message 330 to a remote receiver/transmitter 305, which has line-of-sight with destination aircraft 320. 1090 MHz remote receiver/transmitter 305 transmits a reinforcing 1090 MHz "pseudo" ADS-B transmission 310. 1090 MHz "pseudo" ADS-B transmission 310 may be identical in content to 1090 MHz ADS-B transmission 340 originating from source aircraft 330.

The system selects 1090 MHz remote receiver/transmitter 300, 305, which has line-of-sight and the highest probability of being received at the destination aircraft. A test or multipath simulation may be performed when the system may be first installed to determine, which remote receiver/transmitter has the highest probability of transmission reception success for each location of the movement area or airspace.

The main implementation of ADS-B may be through Mode S or 1090 MHz datalink technology. Mode S message formats have been allocated for ADS-B use. Note that, also, some implementations of ADS-B may use other datalinks (such as digital VHF, or TDMA-like formats). However, the same technology may be applied in the present invention regardless of the datalink selected for use.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A system for re-transmitting position data for a plurality of aircraft, the system comprising:
   means for receiving aircraft position data from a broadcast aircraft position system, the aircraft position data received in a predetermined format from each of a corresponding aircraft equipped with the broadcast aircraft position system;
   means for determining whether a transmission from the broadcast aircraft position system generating the aircraft position data may be blocked to another aircraft;
   means for generating broadcast aircraft position system data in the predetermined format for an aircraft whose transmission from the broadcast aircraft position system may be blocked; and
   means for transmitting the broadcast aircraft position system data in the predetermined format for aircraft whose transmission from the broadcast aircraft position system may be blocked to aircraft equipped with the broadcast aircraft position system such that aircraft equipped with the broadcast aircraft position system can determine locations of aircraft whose transmission from the broadcast aircraft position system may be blocked.

2. The aircraft position location system of claim 1, wherein said means for receiving aircraft position data from a broadcast aircraft position system comprises a receiver for receiving data from a plurality of Automatic Dependent Surveillance System—Broadcast (ADS-B) units on a plurality of corresponding aircraft, each ADS-B unit generating and transmitting position data.

3. The aircraft position location system of claim 2, wherein said means for determining whether a transmission from the broadcast aircraft position system generating the aircraft position data may be blocked to another aircraft comprises a workstation programmed with potential relative positions in which aircraft transmissions from a broadcast aircraft position system generating an aircraft position data may be blocked due to multipath interference.

4. The aircraft position location system of claim 3, wherein said means for generating broadcast aircraft position system data in the predetermined format for aircraft whose transmissions may be blocked comprises software running on the workstation for generating an ADS-B format signal indicating position of a detected aircraft whose transmission from the broadcast aircraft position system generating the aircraft position data may be blocked.

5. The aircraft position location system of claim 4, wherein said means for generating broadcast aircraft position system data in the predetermined format for aircraft whose transmissions may be blocked comprises software running on the workstation for generating an ADS-B format signal replicating an ADS-B transmission from an aircraft whose broadcast aircraft position system generating aircraft position data may be blocked.

6. The aircraft position location system of claim 5, wherein said means for transmitting the broadcast aircraft position system data in the predetermined format for aircraft whose transmission from the broadcast aircraft position system may be blocked comprises a transmitter, for transmitting a replicated ADS-B format signal indicating position of a detected aircraft whose broadcast aircraft position system generating aircraft position data may be blocked.

7. A method for re-transmitting position data for a plurality of aircraft, comprising the steps of:
   receiving aircraft position data from a broadcast aircraft position system, the aircraft position data received in a predetermined format from each of a corresponding aircraft equipped with the broadcast aircraft position system,
   determining whether a transmission from the broadcast aircraft position system generating the aircraft position data may be blocked to another aircraft,
   generating broadcast aircraft position system data in the predetermined format for an aircraft whose transmission from the broadcast aircraft position system may be blocked, and
   transmitting the broadcast aircraft position system data in the predetermined format for aircraft whose transmission from the broadcast aircraft position system may be blocked to aircraft equipped with the broadcast aircraft position system such that aircraft equipped with the broadcast aircraft position system can determine locations of aircraft whose transmission from the broadcast aircraft position system may be blocked.

8. The method of claim 7, wherein said the step of receiving aircraft position data from a broadcast aircraft position system comprises the step of receiving data from a plurality of Automatic Dependent Surveillance System—Broadcast (ADS-B) units on a plurality of corresponding aircraft, each ADS-B unit generating and transmitting position data.

9. The method of claim 8, wherein said step of determining whether a transmission from the broadcast aircraft position system generating the aircraft position data may be blocked to another aircraft comprises the step of comparing received aircraft position data with potential relative positions programmed on a workstation in which aircraft transmissions from a broadcast aircraft position system generating an aircraft position data may be blocked due to multipath interference.

10. The method of claim 9, wherein said the step of generating broadcast aircraft position system data in the predetermined format for aircraft whose transmissions may be blocked comprises the step of generating an ADS-B format signal indicating position of a detected aircraft whose transmission from the broadcast aircraft position system generating the aircraft position data may be blocked.

11. The method of claim 10, wherein said the step of generating broadcast aircraft position system data in the predetermined format for aircraft whose transmissions may be blocked comprises the step of generating an ADS-B format signal replicating an ADS-B transmission from an aircraft whose broadcast aircraft position system generating aircraft position data may be blocked.

12. The method of claim 11, wherein said the step of transmitting the broadcast aircraft position system data in the predetermined format for aircraft whose transmission from the broadcast aircraft position system may be blocked comprises the steps of transmitting a replicated ADS-B format signal indicating position of a detected aircraft whose broadcast aircraft position system generating aircraft position data may be blocked.

13. A system for re-transmitting position data for a plurality of aircraft, the system comprising:
   means for receiving aircraft position data from a Automatic Dependent Surveillance Broadcast (ADS-B) system, the aircraft position data received in a predetermined format from each of a corresponding aircraft equipped with the Automatic Dependent Surveillance Broadcast system;
   means for determining whether a transmission from the Automatic Dependent Surveillance Broadcast system generating the aircraft position data may be blocked to another aircraft;
   means for generating Automatic Dependent Surveillance Broadcast system data in the predetermined format for an aircraft whose transmission from the Automatic Dependent Surveillance Broadcast system may be blocked; and
   means for transmitting the Automatic Dependent Surveillance Broadcast system data in the predetermined format for aircraft whose transmission from the Automatic Dependent Surveillance Broadcast system may be blocked to aircraft equipped with the Automatic Dependent Surveillance Broadcast system such that aircraft equipped with the Automatic Dependent Surveillance Broadcast system can determine locations of aircraft whose transmission from the Automatic Dependent Surveillance Broadcast system may be blocked.

14. The aircraft position location system of claim 13, wherein the predetermined format comprises one of a Commercial Aviation format of ADS-B and a General Aviation format of ADS-B.

15. The aircraft position location system of claim 14, wherein said means for determining whether a transmission from the Automatic Dependent Surveillance Broadcast system generating the aircraft position data may be blocked to another aircraft comprises a workstation programmed with potential relative positions in which aircraft transmissions from a Automatic Dependent Surveillance Broadcast system generating an aircraft position data may be blocked due to multipath interference.

16. The aircraft position location system of claim 15, wherein said means for generating Automatic Dependent Surveillance Broadcast system data in the predetermined format for aircraft whose transmissions may be blocked comprises software running on the workstation for generating an ADS-B format signal indicating position of a detected aircraft whose transmission from the Automatic Dependent Surveillance Broadcast system generating the aircraft position data may be blocked.

17. The aircraft position location system of claim 16, wherein said means for generating Automatic Dependent Surveillance Broadcast system data in the predetermined format for aircraft whose transmissions may be blocked comprises software running on the workstation for generating an ADS-B format signal replicating an ADS-B transmission from an aircraft whose Automatic Dependent Surveillance Broadcast system generating aircraft position data may be blocked.

18. The aircraft position location system of claim 17, wherein said means for transmitting the Automatic Dependent Surveillance Broadcast system data in the predetermined format for aircraft whose transmission from the Automatic Dependent Surveillance Broadcast system may be blocked comprises a transmitter, for transmitting a replicated ADS-B format signal indicating position of a detected aircraft whose Automatic Dependent Surveillance Broadcast system generating aircraft position data may be blocked.

19. A method for re-transmitting position data for a plurality of aircraft, comprising the steps of;
   receiving aircraft position data from a Automatic Dependent Surveillance Broadcast system, the aircraft position data received in a predetermined format from each of a corresponding aircraft equipped with the Automatic Dependent Surveillance Broadcast system,
   determining whether a transmission from the Automatic Dependent Surveillance Broadcast system generating the aircraft position data may be blocked to another aircraft,
   generating Automatic Dependent Surveillance Broadcast system data in the predetermined format for an aircraft whose transmission from the Automatic Dependent Surveillance Broadcast system may be blocked, and
   transmitting the Automatic Dependent Surveillance Broadcast system data in the predetermined format for aircraft whose transmission from the Automatic Dependent Surveillance Broadcast system may be blocked to aircraft equipped with the Automatic Dependent Surveillance Broadcast system such that aircraft equipped with the Automatic Dependent Surveillance Broadcast system can determine locations of aircraft whose transmission from the Automatic Dependent Surveillance Broadcast system may be blocked.

20. The method of claim 19, wherein the predetermined format comprises one of a Commercial Aviation format of ADS-B and a General Aviation format of ADS-B.

21. The method of claim 20, wherein said step of determining whether a transmission from the Automatic Dependent Surveillance Broadcast system generating the aircraft position data may be blocked to another aircraft comprises the step of comparing received aircraft position data with potential relative positions programmed on a workstation in which aircraft transmissions from a Automatic Dependent Surveillance Broadcast system generating an aircraft position data may be blocked due to multipath interference.

22. The method of claim 21, wherein said the step of generating Automatic Dependent Surveillance Broadcast system data in the predetermined format for aircraft whose transmissions may be blocked comprises the step of generating an ADS-B format signal indicating position of a detected aircraft whose transmission from the Automatic Dependent Surveillance Broadcast system generating the aircraft position data may be blocked.

23. The method of claim 22, wherein said the step of generating Automatic Dependent Surveillance Broadcast system data in the predetermined format for aircraft whose transmissions may be blocked comprises the step of generating an ADS-B format signal replicating an ADS-B transmission from an aircraft whose Automatic Dependent Surveillance Broadcast system generating aircraft position data may be blocked.

24. The method of claim 23, wherein said the step of transmitting the Automatic Dependent Surveillance Broadcast system data in the predetermined format for aircraft whose transmission from the Automatic Dependent Surveillance Broadcast system may be blocked comprises the steps of transmitting a replicated ADS-B format signal indicating position of a detected aircraft whose Automatic Dependent Surveillance Broadcast system generating aircraft position data may be blocked.

* * * * *